INVENTOR
WILLIAM T. HICKS

Fred C. Carlson
ATTORNEY

INVENTOR
WILLIAM T. HICKS

BY *Fred C. Carlson*
ATTORNEY

SEEBECK COEFFICIENT AND FIGURE OF MERIT FOR Au-Ni ALLOYS AS A FUNCTION OF COMPOSITION

INVENTOR
WILLIAM T. HICKS

BY

Fred C. Carlson
ATTORNEY

United States Patent Office 3,438,819
Patented Apr. 15, 1969

3,438,819

THERMOELECTRIC ALLOY OF GOLD AND NICKEL

William T. Hicks, Brandywine Hundred, Del., assignor to E. I. du Pont de Nemours and Company, Wilmington, Del., a corporation of Delaware Continuation-in-part of application Ser. No. 419,722, Dec. 21, 1964. This application May 18, 1967, Ser. No. 639,320
Int. Cl. H01v *1/22;* C22c *5/00*
U.S. Cl. 136—241 1 Claim

ABSTRACT OF THE DISCLOSURE

A thermocouple having as an essential component thereof a negative leg consisting of an alloy in which there is from 6 to 11% by weight of nickel, the balance being gold, and thermoelectric devices having as an essential component thereof at least one such thermocouple.

*Cross-reference to related application*

This application is a continuation-in-part of my copending application Ser. No. 419,722 filed Dec. 21, 1964, now abandoned.

BACKGROUND OF THE INVENTION

*Field of the invention*

Thermocouples and thermoelectric devices employing same.

*Description of the prior art*

The best-known and most widely used thermoelectric metal alloy hitherto has been a copper-nickel alloy known as "Constantan." Generally alloys of this type contain about 60% copper and 40% nickel. The absolute Seebeck coefficients of such thermoelectric alloys vary from —50 $\mu$v. per degree at 100° C. to —73 $\mu$v. per degree at 900° C. (Negative values given to characterize the thermoelectric materials described in this application indicate that when subjected to a temperature gradient, the cold junction develops an electromotive force which is negative when compared with the hot junction.) Below this temperature range, "Constantan" has an almost constant Figure of Merit of $0.22\times10^{-3}$ deg. $^{-1}$.

For the purposes of this invention, Seebeck coefficient, $\alpha$, is calculated from measured voltage at a small-known temperature differential by the formula $$\alpha=\frac{EMF}{\Delta T}$$

The Figure of Merit for thermoelectric materials takes into account the fact that both low thermal conductivity and high Seebeck coefficient are necessary for a good thermoelectric material. The equation for calculating the Figure of Merit is as follows:

$$Z \text{ (Figure of Merit in } ^{\circ}\text{C.}^{-1}) = \frac{\alpha^2}{\rho K}$$

where $\rho$ is the electrical resistivity in ohm-cm., $\alpha$ is the Seebeck coefficient in volts per degree centigrade, and K. is the thermal conductivity in watts per centimeter degree. For gold-nickel alloys, K may be calculated from the well-known Wiedemann-Franz relation:

$$K\rho=\frac{\pi^2}{3}\cdot(k/e)^2T$$

where $\rho$ is resistivity, $k$ is the Boltzmann constant, $e$ is the electronic charge, and T is the absolute temperature.

There has recently been disclosed a thermoelectric alloy which is a binary of gold and nickel of the composition gold–17.5 wt. percent nickel. Although thermoelectrical properties superior to those exhibited by "Constantan" have been claimed for this binary alloy, the phase diagram for the gold-nickel system indicates that below 720° C. an alloy of this weight composition decomposes into two solid phases, one rich in gold and one rich in nickel. The thermoelectric properties of this two-phase system have been found to be no better than those of "Constantan" which is a stable alloy.

*Summary*

An object of the present invention is the production of alloys of gold and nickel having exceptionally good thermoelectric properties. Another object is the production of devices employing these alloys of gold and nickel as thermocouples, electric power generators, heat pumps, and other devices where alloys exhibiting thermoelectric properties are required. A further object is the production of thermoelectric alloys which exhibit exceptionally high Seebeck coefficients, low electrical resistivities, and high Figures of Merit at temperatures in the range of about 25° C. to about 1000° C. A still further object is the production of thermoelectric alloys in which the electrical properties remain essentially unchanged over the temperature range of about 25° C. to about 1000° C. Other objects will appear hereinafter.

Now according to the present invention it has been found that binary alloys of gold and nickel which have a nickel content of about from 6 to 11% by weight of the alloy, the balance being gold, show outstanding thermoelectric properties, particularly in the temperature range of from room temperature up to the melting point of these alloys, i.e. about 1000° C. The alloys of this compositional range have been found to exhibit thermoelectric properties superior to those of any previously known stable thermoelectric alloy, and to be useful as thermoelectric elements in the above-mentioned thermoelectric devices.

*Description of the preferred embodiments*

The following examples describe the preparation and testing of particular embodiments of the thermoelectric alloys of this invention.

EXAMPLE 1

A binary alloy of gold and nickel, of composition 9 weight percent nickel and the balance gold, was prepared as follows: 9.0000 grams of powdered nickel of the highest purity commercially available was mixed with 91.0000 grams of gold powder, also of the highest purity commercially available. The powder mixture was placed in an alumina crucible and heated in an inert atmosphere to 1050° C. The temperature was held at 1050° C. for 30 minutes, and the melt was then solidified by reducing the temperature in the furnace to 900° C. The inert atmosphere was maintained and the temperature held at 900° C. for 15 hours, following which the gold-nickel alloy was quenched in cold water. The allow was rolled to sheet of 0.025" thickness. The sample was recrystallized by an additional anneal of 4 hours at 850° C. in inert gas, followed by a water quench.

Figure 1:
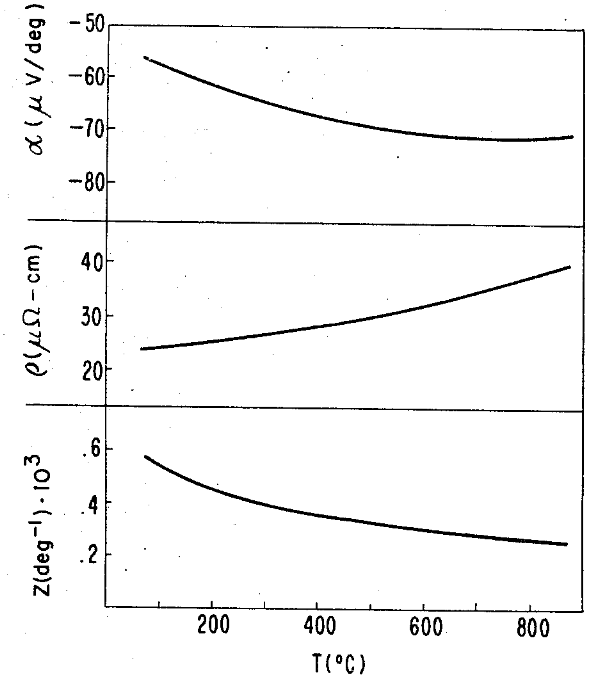
FIGURE 1 shows the Seebeck coefficient, electrical resistivity, and Figure of Merit values of an alloy of the invention plotted against temperature.

The alloy sheet was tested for thermoelectric properties at temperatures from 100° C. to 900° C. FIGURE 1 is a graph showing Seebeck coefficient, electrical resistivity, and Figure of Merit values plotted against temperature. According to the phase diagram which is given in Constitution of Binary Alloys, 2nd Ed. (Hansen) 1958, the alloy composition of this example is within a miscibility gap in the gold-nickel system, but the two-phase region extends over a narrow temperature region, at temperatures below 610° C.

During the time involved in taking the measurements illustrated in FIGURE 1 (approximately 12 hours), the temperature was cycled from room temperature to 900° C. to room temperature. As evidenced by electrical properties, no change or conversion to a two-phase system was noted. With extended use of this alloy at temperatures between 400 and 600° C., some decomposition of the alloy to the two-phase structure does take place. The decomposition takes place, however, only over a narrow temperature range. Furthermore, the two-phase mixture which forms in extended heating of the alloy of this example contains a smaller proportion of nickel-rich phase, the thermoelectric properties of which are inferior to those of the gold-rich phase.

Figure 2:
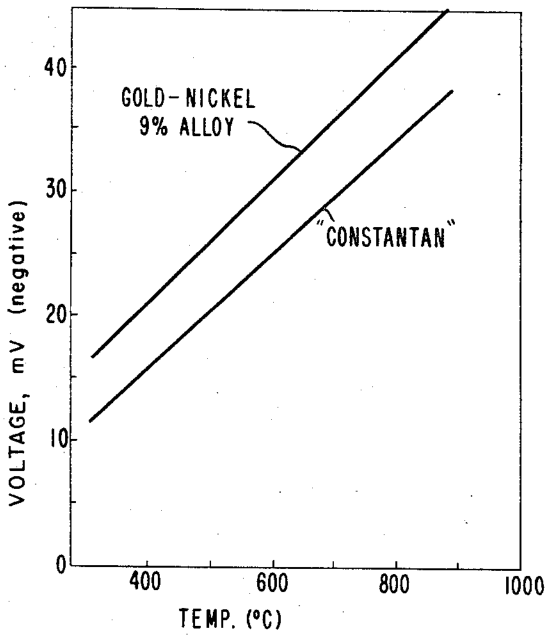
FIGURE 2 shows EMF (voltage, in mv., negative) plotted against hot junction temperature in the range of 300° C. to 900° C., for an alloy of the invention.

With the use of platinum leads, measurements of total voltage of a strap of alloy prepared according to this example were made. There is shown in FIGURE 2 a plot of electromotive force (voltage, in mv., negative) versus hot junction temperature in the range of 300° C. to 900° C. The cold junction was at about room temperature. For comparison, there is included also the measurements made for the standard thermoelectric alloy "Constantan" in the same temperature range. No sign of instability in the gold-nickel alloy of this example appeared, even though several heating and cooling cycles were used in obtaining the measurements.

EXAMPLE 2

Using the procedure of Example 1, two other alloys of gold and nickel were prepared for compariosn and tested for electrical properties. These alloys were outside the scope of this invention, their compositions being 2 weight percent nickel, balance gold, and 17.5 weight percent nickel, balance gold. These alloys were also given a recrystallization anneal at 850° C. followed by a water quench, before measurements were started.

Figure 3:
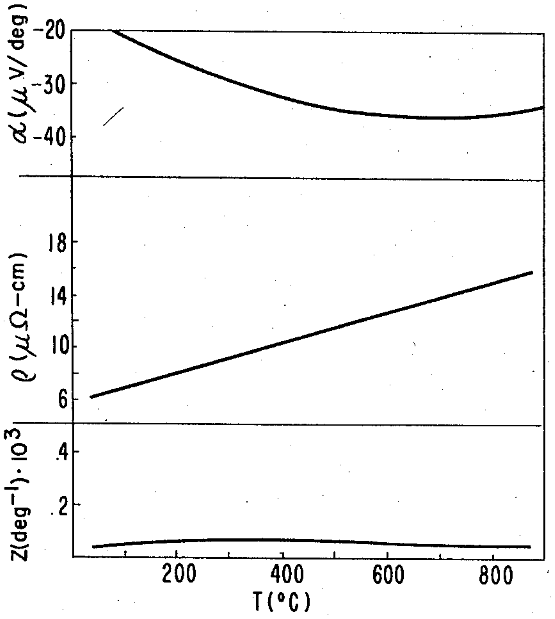
FIGURES 3 and 4 show, for comparison purposes, the same values as shown in FIGURE 1, but for closely related alloys outside of the invention.

FIGURE 3 shows values for Seebeck coefficient, electrical resistivity, and Figure of Merit for the gold–2% nickel alloy plotted against temperatures of 100° C. to 900° C. It will be seen that the electrical properties for an alloy of gold–2 wt. percent nickel are considerably poorer than the properties of the gold–9% nickel alloy of Example 1.

Figure 4:
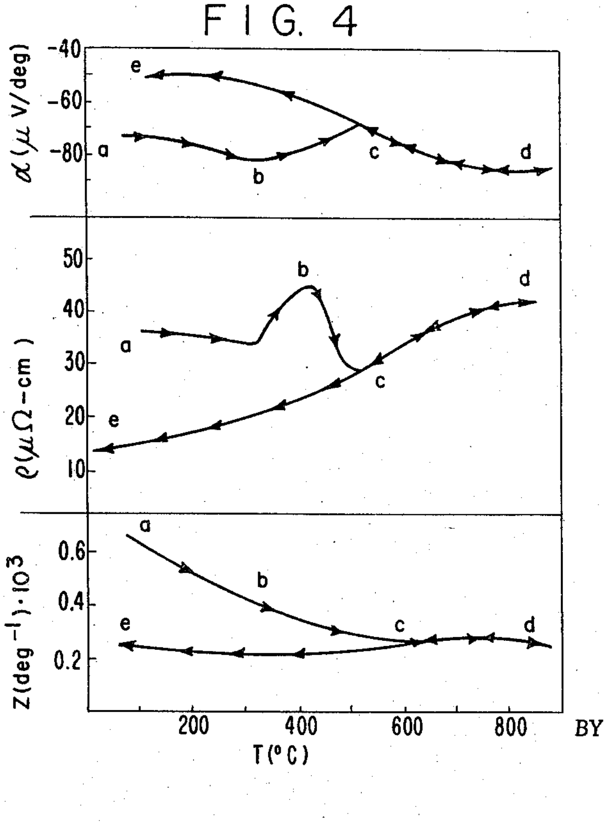

FIGURE 4 shows values for Seebeck coefficient, electrical resistivity, and Figure of Merit for a gold–17.5% nickel alloy plotted against temperatures of 100° C. to 900° C. Measurements were started at points indicated as *a* in each of the three groups. In this single-phase metastable state, this alloy exhibits theremoelectric properties comparable to those exhibited by the gold 9 wt. percent nickel alloy of Example 1. However, as the temperature was increased in the range of 300° to 400° C., the alloy decomposed into two phases as shown by the abrupt change in properties indicated at points marked *b*. As the alloy is heated further, it again becomes single phase at about 550° C. to 700° C. as shown at points *c*. The single-phase alloy then showed good thermoelectric properties up to about 900° C., points *d* on the graphs. When the alloy was cooled from this temperature to about 100° C., it again became a two-phase system having the inferior electrical properties shown at points *e*. The total time involved in making these measurements was approximately the same as in testing the alloy of Example 1, about 12 hours.

EXAMPLE 3

Nine binary gold-nickel samples were prepared as in Example 1 with the following compositions: 2, 3, 5, 7, 9, 11, 13, 15 and 17.5 weight percent nickel. They were melted in an inert gas at 1050° C. for 30 minutes, then solidified and given a homogenizing anneal in inert gas at 900° C. for 15 hours. Finally, the samples were water-quenched to prevent decomposition to two phases. The samples were all cold-rolled to 0.025" thickness. Samples with the content of nickel greater than 13 weight percent were very difficult to roll to this thickness and showed considerable tendency to crack and laminate during the rolling operation. Some of these samples had to be reheated to 900° C. and again water-quenched to relieve the work hardening before they could be rolled to the final thickness. Samples of compositions 11 weight percent nickel and below were relatively easy to roll without additional heat treatment. ⅛" wide strips were cut for measurement of thermoelectric properties. The samples were recrystallized by an additional anneal of four hours at 850° C. in inert gas followed by a water quench.

Figure 6:
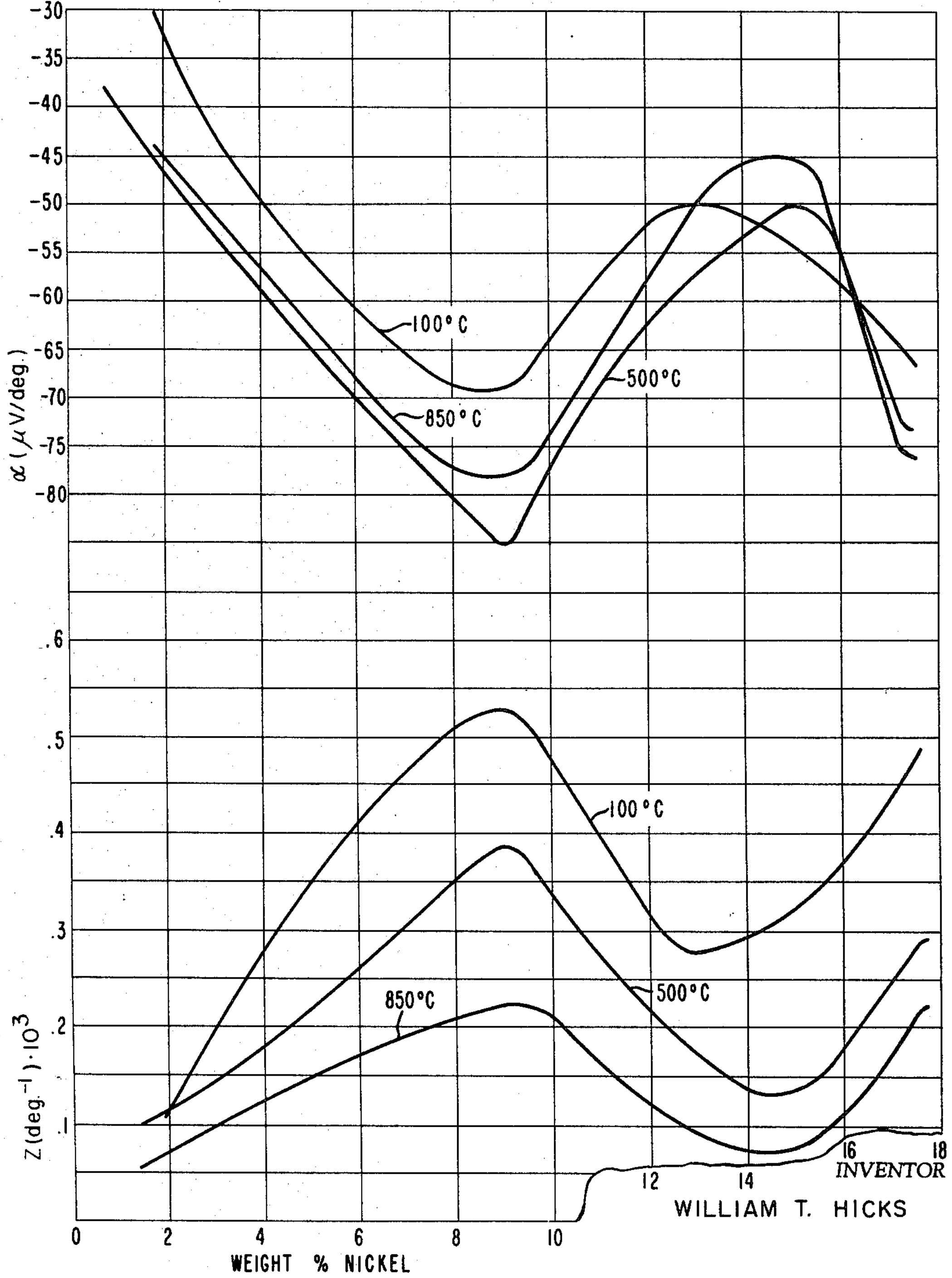
FIGURE 6 shows variations in Seebeck coefficients and Figure of Merit values as a function of composition for alloys of the invention and alloys closely related to the invention, at three different temperatures.

Thermoelectric properties were measured on the samples as the temperature was increased from 100° C. to 850° C. and again as the temperature was returned to 100° C. Platinum leads were used for these measurements and corrections have been made to the Seebeck coefficient $\alpha$ for the absolute Seebeck coefficient of platinum. FIGURE 6 shows the Seebeck coefficient $\alpha$ and the Figure of Merit Z as a function of composition for three different temperatures: 100, 500 and 850° C. The values shown are averages of the Seebeck coefficient values measured as the samples were heated and cooled. Generally, there was a much greater spread in values measured at 100 and 500° C. when the samples were heated or cooled at compositions containing greater than 12 weight percent nickel. In this composition range at all three temperatures, maxima were found in the absolute value of the Seebeck coefficients and in the value of Z at 9 weight percent and 17.5 weight percent nickel. At 13 weight percent nickel, a minimum was discovered when measurements were made at 100° C., which shifted slightly to 14 or 15 weight percent nickel at 500 and 850° C. Alloys whose composition would fall between 13 and 15 weight percent nickel would be less useful for thermoelectric applications. Their Seebeck coefficients are no higher than those of the well-known thermoelectric copper-nickel alloy, Constantan.

The maximum or optimum thermoelectric properties found at 9 weight percent and the minimum in thermoelectric properties found at 13 to 15 weight percent is completely unexpected to one skilled in the art of thermoelectric alloys. A similar binary alloy system (copper-nickel) has been studied by a number of investigators, e.g. D. D. Pollock (Transactions AIME, 224, 892 (1962)). This article shows that theory would predict a single maximum in Seebeck coefficient values for alloys of Group VIII and Group I–B metals at a composition of 42.5 atomic percent of the Group VIII metal (in this case nickel). From the known prior art, the formation of a maximum in Seebeck coefficient for the gold-nickel system at 9 weight percent and a minimum at approximately 13 to 15 weight percent nickel is quite unexpected.

It is evident from FIGURE 6 that alloys of composition range 6 to 11 weight percent nickel possess thermoelectric properties superior or equivalent to known prior art alloys. The unexpected minimum in thermoelectric properties at 13 to 15 weight percent nickel indicates a difference in kind of alloy rather than simply a difference in degree. In addition, alloys of the preferred composition range, 6 to 11 weight percent nickel, are stable since according to the phase diagram, they have a possibility of decomposing only at lower temperatures. Also they are less apt to decompose due to slower kinetics prevailing at lower temperatures. This is verified by comparing FIGURES 1 and 4. Furthermore, compositions containing 6 to 11 weight percent nickel are more ductile and easily worked than alloys of compositions containing greater than the known 14.5 weight percent nickel. Finally, the alloys of the preferred composition range are more chemically inert since they contain less base metal (nickel).

The superior thermoelectric properties of gold-nickel alloys of this invention, in combination with other properties such as chemical inertness, oxidation resistance, high melting point, and high ductility make these alloys very valuable in a large number of electrical applications by means of methods well known to those skilled in the art. These include theremoelectric power production, thermoelectric refrigeration, and thermocouples for temperature indication and for measurement of radiant and other forms of energy.

Figure 5:
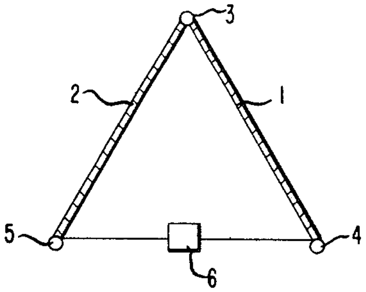
FIGURE 5 shows a thermoelectric device employing an alloy of the invention as an essential element thereof.

Devices in which the alloys of this invention can be employed for power production are illustrated by the diagram shown as FIGURE 5. In this triangle 1 represents the alloy of this invention, 2 is a positive thermoelectrical material, for example Chromel, 3 is a junction formed by welding, brazing or hot pressing and is heated to approximately 900° C. when the device is in operation, 4 is a cold junction maintained at low temperatures of around 25° C. and of negative polarity, 5 is a cold junction which is positive in polarity, and 6 is the working load energized by the device. If it is desired, copper leads may be soldered at points 4 and 5. Several devices of this design may be attached in series combinations to yield voltage desired.

If there is substituted a DC voltage source at 6, the junction 3 is cooled and the device may be used as a cooling device.

If semiconductor materials such as bismuth telluride, lead telluride, or germanium-silicon alloys, or other semiconductor alloys having good thermoelectric properties, or combinations of such semiconductor materials are used in leg (2) of the device, it is possible to obtain even higher degrees of efficiency in the devices.

I claim:

1. A thermocouple having a positive and negative element, said negative element consisting of a binary alloy of composition 6 to 11 percent by weight nickel, the balance being gold.

References Cited

UNITED STATES PATENTS

| | | | |
|---|---|---|---|
| 2,846,493 | 8/1958 | Lindenblad | 75—165 X |
| 2,846,494 | 8/1958 | Lindenblad | 136—241 X |

OTHER REFERENCES

Zeitschrift fur Physikalische Neue Folge, Bd 14 1958, "Entmischungskurve und Kritischer Punkt des Systems Gold-Nickel," pp. 296–305.

CHARLES N. LOVELL, *Primary Examiner.*

U.S. Cl. X.R.

75—165